US005603244A

United States Patent [19]

Tischer

[11] Patent Number: 5,603,244

[45] Date of Patent: Feb. 18, 1997

[54] ACTUATING DEVICE FOR THE THROTTLE VALVE OF A CARBURETOR FOR USE WITH AN AUTOMATIC TRANSMISSION OF A MOTORIZED VEHICLE

[75] Inventor: Dieter Tischer, Wendlingen, Germany

[73] Assignee: Hydraulik-Ring Antriebs-und Steuerungstechnik GmbH, Nurtingen, Germany

[21] Appl. No.: 282,734

[22] Filed: Jul. 29, 1994

[30] Foreign Application Priority Data

Jul. 29, 1993 [DE] Germany .......................... 43 25 417.9

[51] Int. Cl.$^6$ .......................... F16C 1/10

[52] U.S. Cl. .......................... 74/500.5; 477/181

[58] Field of Search .......................... 74/500.5, 501.5 R, 74/502, 502.4, 502.6; 192/4 R, 84 R, 86; 180/197; 477/181, 111

[56] References Cited

U.S. PATENT DOCUMENTS

| | | | |
|---|---|---|---|
| 2,414,717 | 1/1947 | Chapman | 477/181 |
| 3,105,578 | 10/1963 | Meyer | 477/181 |
| 3,204,719 | 9/1965 | Grozinger | 192/84 R |
| 3,269,206 | 8/1966 | Carr | 192/8 R |
| 3,814,224 | 6/1974 | Podssuweit et al. | 192/84 R |
| 4,724,675 | 2/1988 | Douillet | 74/500.5 X |
| 4,872,365 | 10/1989 | Wolf | 74/500.5 |
| 4,938,304 | 7/1990 | Yamaguchi et al. | 180/197 |
| 5,078,242 | 1/1992 | Ratke et al. | 192/4 R |
| 5,377,556 | 1/1995 | Byrnes | 74/502.6 |

FOREIGN PATENT DOCUMENTS

| | | | |
|---|---|---|---|
| 1921852 | 1/1965 | Germany . | |
| 3703482 | 8/1988 | Germany . | |
| 4-76233 | 3/1992 | Japan | 74/500.5 |

*Primary Examiner*—Vinh T. Luong
*Attorney, Agent, or Firm*—Robert W. Becker & Associates

[57] ABSTRACT

An actuating device for a throttle valve of a carburetor used in connection with an automatic transmission, wherein the throttle valve is connected to a throttle shaft and a position of the throttle shaft is adjustable by the accelerator pedal of the vehicle, has a linkage including a first part and a second part. The first part is connected to the throttle shaft and the second part is connected to the accelerator pedal. During an automatic gear shifting operation the first part is displacable relative to the second part with a pressure medium. The first part is preferably a piston with a piston rod whereby the piston is loaded by the pressure medium. The second part includes a housing in which the position is displacably arranged.

12 Claims, 4 Drawing Sheets

Fig.2a
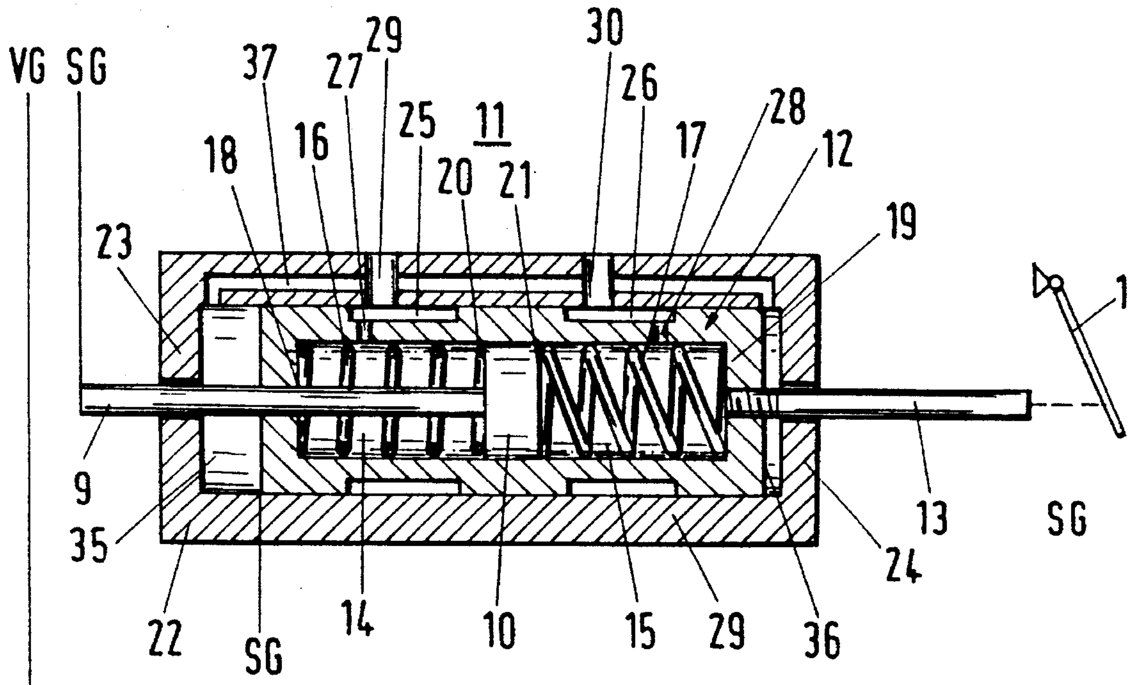
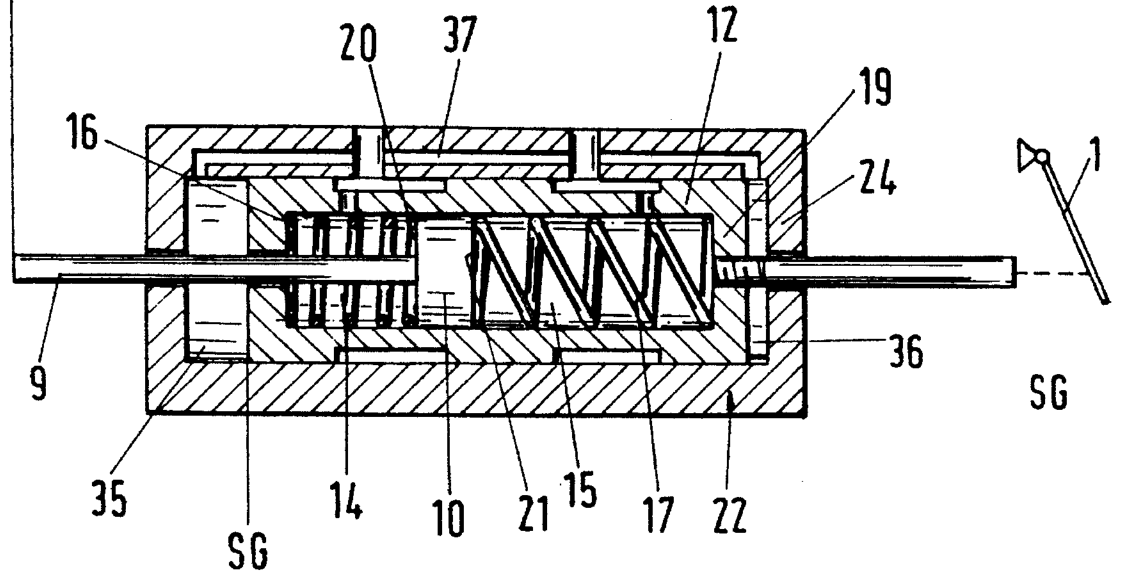
Fig. 2b

ACTUATING DEVICE FOR THE THROTTLE VALVE OF A CARBURETOR FOR USE WITH AN AUTOMATIC TRANSMISSION OF A MOTORIZED VEHICLE

BACKGROUND OF THE INVENTION

The present invention relates to an actuating device for a throttle valve of a carburetor for the use with an automatic transmission of a motorized vehicle wherein the throttle valve is positioned on a throttle shaft that is displacable by a linkage connected to the accelerator pedal of the motorized vehicle.

By pressing on the accelerator pedal, the throttle valve in the carburetor is displaced into the desired position. Automatic transmissions comprise, in addition to the throttle valve, an adjusting device with which during an automatically performed gear shifting operation the automatic transmission displaces the throttle valve into a position that is required for the gear shift operation and is independent of the position of the accelerator pedal. The adjusting device acts directly on the linkage so that upon displacement of the throttle valve via this linkage the accelerator pedal is also displaced. Accordingly, the driver recognizes the displacement of the throttle valve performed by the adjusting device due to the corresponding movement of the accelerator pedal.

It is an object of the present invention to improve an adjusting device of the aforementioned kind such that an automatic gear shifting operation does not effect a displacement of the accelerator pedal.

SUMMARY OF THE INVENTION

The actuating device for a throttle valve of a carburetor used in connection with an automatic transmission, wherein the throttle valve is connected to a throttle shaft and a position of the throttle shaft is adjustable by the accelerator pedal of the vehicle, is primarily characterized by:

A linkage comprising a first part and a second part;

The first part connected to the throttle shaft and the second part connected to the accelerator pedal; and Wherein, for an automatic gear shifting operation, the first part is displacable relative to the second part with a pressure medium.

Preferably, the first part is a piston with a piston rod, the piston being loaded by the pressure medium.

Preferably, the second part comprises a housing in which housing the piston is displacably positioned.

In a preferred embodiment of the present invention, the second part comprises an intermediate member connected to the housing and pivotably connected to the accelerator pedal.

Expediently, the housing has two pressure chambers separated from one another by the piston.

In another embodiment of the present invention the actuating device further comprises a pressure medium source with valves, wherein each pressure chamber is connected with one valve to the pressure medium source.

The valves are preferably proportional solenoids.

Advantageously, the actuating device further comprises a means for biasing the piston into a middle position within the housing, wherein the piston remains in the middle position as long as an automatic gear shifting operation does not take place.

Preferably, the means for biasing is comprised of two oppositely acting compression springs that are preferably positioned in the pressure chambers.

In an alternative embodiment the means for biasing is a single compression spring. Preferably the housing comprises a spring chamber for receiving the single compression spring.

Preferably, the actuating device further comprises two spring plates, wherein the compression spring has free ends, with each free end abutting at one of the spring plates. Preferably, the spring plates are positioned on the piston rod. Advantageously, the piston rod has a tapered section on which the spring plates are supported.

In another embodiment of the present invention the tapered section has a free end and a securing element connected to the free end wherein one of the spring plates is supported in the middle position of the piston at the securing element. The securing element is preferably a securing ring.

Advantageously, the piston rod further has an enlarged section adjacent to the tapered section such that the enlarged section forms an annular shoulder adjacent to the tapered section. The other spring plate in the middle position of the piston is then supported at the annular shoulder.

Preferably, the housing has two abutment surfaces for supporting a respective one of the spring plates during an automatic gear shifting operation. The distance between the securing element and the annular shoulder is equal to the distance between the two abutment surfaces of the housing.

Advantageously, the housing has a partition for separating the spring chamber from the pressure chamber.

Expediently, the actuating device further comprises a bearing housing wherein the housing is displacable within the bearing housing. Preferably, the bearing housing has chambers located at ends of the bearing housing and delimited by the housing in an inward direction, the actuating device further comprising a compensation line connecting the chambers of the bearing housing.

In the inventive actuating device the linkage is comprised of two parts. As long as no gear shifting operation takes place, the two parts act as a rigid linkage. By actuating the accelerator pedal the throttle valve is displaced, respectively, adjusted accordingly via both parts of the linkage. When the automatic transmission performs a gear shifting operation, the part of the linkage connected to the throttle shaft is displaced by a pressure medium relative to the linkage part connected to the accelerator pedal. Due to this relative displacement the part of the linkage connected to the accelerator pedal remains in its position during the gear shifting operation while the other part of the linkage connected to the throttle shaft rotates the throttle shaft and thus the throttle valve. The position of the accelerator pedal is thus not altered during the gear shifting operation. The driver recognizes the gear shifting operation at the accelerator pedal only because the return force which acts on the throttle valve, respectively, the throttle shaft, has changed.

BRIEF DESCRIPTION OF THE DRAWINGS

The object and advantages of the present invention will appear more clearly from the following specification in conjunction with the accompanying drawings, in which:

FIG. 2*a* shows in a longitudinal section and enlarged a control device of the inventive actuating device in a base position;

FIG. 2*b* shows the control device of FIG. 2 in a position during the automatic gear shifting operation whereby the accelerator pedal of the vehicle is in an idle position;

DESCRIPTION OF PREFERRED EMBODIMENTS

The present invention will now be described in detail with the aid of several specific embodiments utilizing FIGS. 1 through 4.

Figure 1:
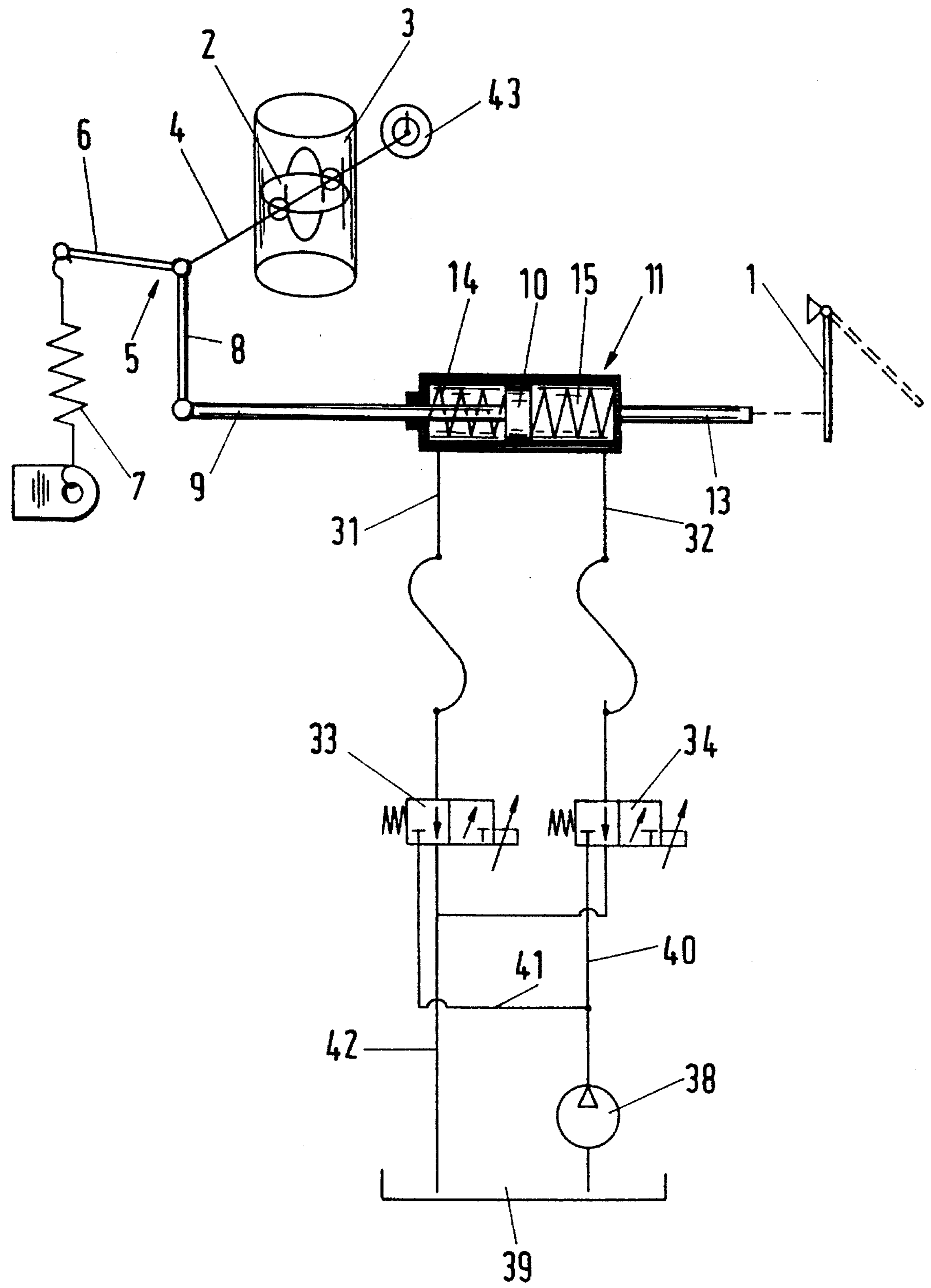
FIG. 1 shows a schematic representation of the inventive actuating device.

The actuating device according to FIG. 1 serves to adjust a throttle valve 2 of a carburetor 3 with an accelerator pedal 1 of a vehicle. The throttle valve 2 is fixedly connected to a throttle shaft 4 to which is also fixedly connected an angular lever 5. At the free end of one arm 6 of the angular lever 5 a tension spring 7 is connected which with its other end is connected to the vehicle. With the tension spring 7 the throttle shaft 4 and thus the throttle valve 2 is biased into the closed position. At the free end of the other arm 8 of the angular lever 5 a piston rod 9 is connected which at the other end has a piston 10. The piston 10 is part of a control device 11 which will be explained in detail with the aid of FIGS. 2 and 3. The control device 11 has a housing 12 in which the piston 10 is slidably guided (FIG. 2*a*). To the housing 12 an intermediate member 13 is fixedly connected which with the other end is coupled to the accelerator pedal 1.

The piston 10 divides the interior of the housing 12 into two pressure chambers 14 and 15 which are sealed relative to one another and in which coil compression springs 16 and 17 are accommodated. The compression springs 16 and 17 are supported with one end at the end faces 18 and 19 of the housing 12 and with the other end at the end faces 20 and 21 of the piston 10. The compression springs 16, 17 are designed such that they exert the same amount of pressure in opposite directions onto the piston 10.

The housing 12 is axially slidably accommodated within a bearing housing 22. The piston rod 9 extends in a sealing manner through the end wall 23 of the bearing housing 22. The intermediate member 13 extends through the oppositely arranged end wall 24 of the housing 22.

The housing 12 is provided with annular grooves 25 and 26 arranged at an axial distance relative to one another. Boresores 27 and 28 which extend through the cylindrical wall of the housing 12 open into the grooves 25, 26. These bores 27, 28 are arranged in the vicinity of the end faces of the annular grooves 25, 26 that are facing away from one another and connect the pressure chambers 14 and 15 of the housing 12. Furthermore, bores 29 and 30 which penetrate radially the cylindrical wall 22' of the bearing housing 22 open into the annular grooves 25, 26. The bores 29 and 30 are connected to supply lines 31 and 32 (FIG. 1) which connect the control device 11 with valves in the form of proportional solenoid valves 33, 34. The solenoid valves 33, 34 are actuated by a non-represented electronic carburetor control.

FIG. 2*a* shows the accelerator pedal 1 in the idle position. The piston 10 is positioned in its middle position which is defined by the compression springs 16 and 17 acting counter to one another. The two pressure chambers 14 and 15 are without pressure.

Figures 3A, 3B:
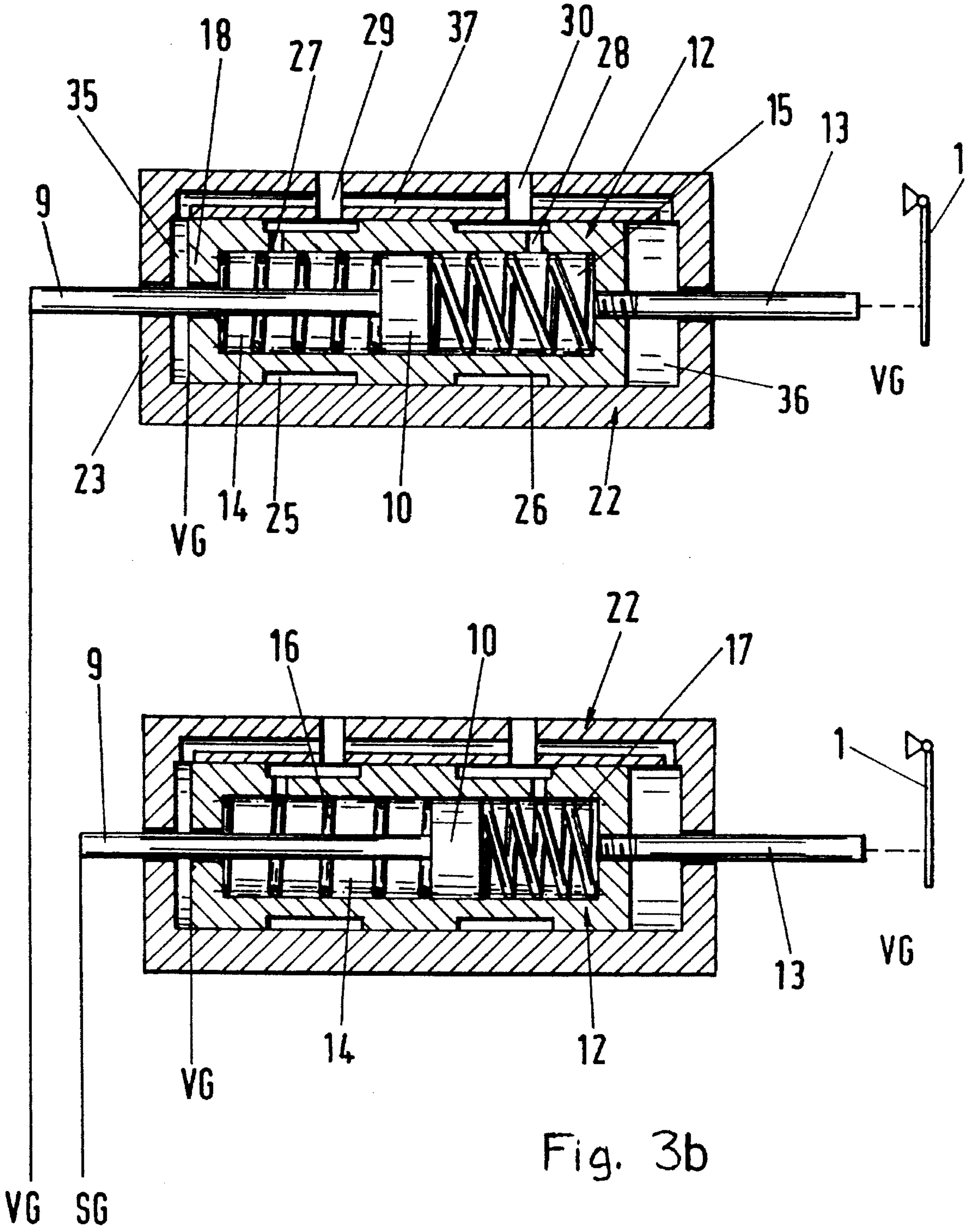
FIGS. 3*a*, 3*b* show the control device in a representation corresponding to FIGS. 2*a* and 2*b* whereby the accelerator pedal is in a full load position.

As long as the automatic transmission of the vehicle does not perform a gear shifting operation and the accelerator pedal 1 is pressed down, the throttle valve 2 is adjusted proportional to the travel of the accelerator pedal 1 via the intermediate member 13, the housing 12, the piston rod 9, and the angular lever 5. FIG. 3*a* shows this for the case in which the accelerator pedal 1 is in the full load position. Within the bearing housing 22 the housing 12 is displaced. The intermediate member 13, the housing 12, and the piston rod 9 together with the piston 10 act as a rigid unit, i.e., the piston 10 is not displaced within the housing 12. Accordingly, the movement of the accelerator pedal 1 is transmitted to the throttle shaft 4 in the manner of a conventional accelerator linkage. The chambers 35 and 36 positioned between the end faces 18 and 23, respectively, 19 and 24 of the housing 12 and the bearing housing 22 are connected with one another with a compensation line 37 of the bearing housing 22. This allows for an easy displacement of the housing 12 within the bearing housing 22 whereby the gaseous medium, preferably air, within one of the chambers 35 or 36 is displaced into the other chamber via the compensation line 37. Instead of a gaseous medium the chambers 35, 36 may contain a liquid medium that can also be displaced via the compensation line 37. During the displacement of the bearing housing 12 the compression springs 16, 17 maintain the piston 10 in its defined middle position (FIGS. 2*a* and 3*a*). As long as no gear shifting operation takes place and the accelerator pedal is actuated, the two proportional solenoid valves 33, 34 are switched such, as shown in FIG. 1, that the pressure chambers 14, 15 are connected via return line 42 to a reservoir 39 for the hydraulic medium.

When the automatic transmission of the vehicle performs a gear shifting operation, the piston rod 9 is axially displaced relative to the intermediate member 13 in order to rotate the throttle valve 2 into the position required for the respective gear shifting operation. In FIG. 2*b* the case is represented in which the gear shifting initiated by the automatic transmission takes place when the accelerator pedal 1 is in its idle position, i.e., when the accelerator pedal 1 is not activated. In this case the housing 12 is positioned to the right within the bearing housing 22, as shown in FIGS. 2*a* and 2*b*. The throttle shaft 4 in this case is rotated counterclockwise so that the throttle valve 2 is in its maximum throttling position. The chamber 36 between the two end walls 19 and 24 of the housing 12 and the bearing housing 22 has its smallest volume. The medium within the chamber 36 has been displaced via the compensation line 37 into the oppositely arranged chamber 35. When in this position the gear shifting operation takes place, the throttle valve 2 must be displaced such that the throttle cross-section within the carburetor 3 is enlarged. This means that the piston rod 9 in FIGS. 1 and 2 must be displaced to the left so that the throttle shaft 4 is rotated in a clockwise direction and the throttle valve 2 is correspondingly pivoted toward its open position. The automatic transmission sends a corresponding signal for the gear shifting operation to the electronic carburetor control which, in turn, switches the proportional solenoid valves 33, 34. In the described case the proportional solenoid valve 33 remains in a switching position such that the pressure chamber 14 is connected via the supply line 31 to the return line 42. The other valve 34 is switched such that the hydraulic medium is pumped with a pump 38 from the reservoir 39 via line 40 into the pressure chamber 15. Accordingly, the force of the compression spring 17 acts on the piston surface 21 together with the hydraulic pressure present within the pressure chamber 15, while the piston 10 at the opposite end face 20 is loaded only by the force of the compression spring 16. Thus, the piston 10 is displaced to the left within the housing 12 counter to the force of the compression spring 16, as shown in FIG. 2*b*. The position of the housing 12 relative to the bearing housing 22 remains unchanged. Thus, during this displacement action of the piston rod 9 the position of the accelerator pedal 1 remains unchanged. Accordingly, despite the unchanged position of the accelerator pedal 1 the throttle valve 2 is pivoted into the required position for the automatic gear shifting operation. However, the driver recognizes due the corresponding change of the force resulting from the return spring 7 that a change of the position of the throttle valve 2 has taken place.

As soon as the gear shifting operation is terminated, the carburetor control switches the proportional solenoid valve 34 into the position represented in FIG. 1 so that the hydraulic medium contained within the pressure chamber 15 can be returned to the reservoir 39. The piston 10 is then returned by the compression spring 16 into its defined middle position within the housing 12.

With the aid of FIG. 3*b* the case will be explained in which a gear shifting operation is performed by the automatic transmission when the accelerator pedal 1 is pressed down. In this example it is presumed that the accelerator pedal is under full load, i.e., the throttle valve 2 is in its maximum open position. As long as a gear shifting operation does not occur, the intermediate member 13, the housing 12, the piston 10, and the piston rod 9 operate as a rigid unit. These parts therefore act as a conventional accelerator linkage. Since the accelerator pedal 1 is completely pressed down, the housing 12 within the bearing housing 22 is displaced to the left to its maximum extent. The chamber 35 between the two end walls 18 and 23 of the housing 12 and the bearing housing 22 has its smallest possible volume. Upon displacement of the housing 12 the medium contained within the chamber 35 has been displaced via the compensation line 37 into the oppositely arranged chamber 36. The angular grooves 25, 26 of the housing 12 have an axial length such that in both maximum displaced positions of the housing 12 there is still a connection to the bores 29, 30 of the bearing housing 22 provided. Accordingly, it is ensured that the hydraulic medium in both end positions of the housing 12 can reach via the bores 27 and 28 of the housing 12 the respective pressure chambers 14 and 15. Since the housing 12 in FIG. 3*a* is displaced to the maximum to the left, the throttle shaft 4 and thus the throttle valve 2 are rotated, respectively, pivoted with the angular lever 5 in a clockwise direction into the maximum possible position.

When in this full load position of the accelerator pedal 1 a gear shifting operation takes place, the proportional solenoid valve 33 is switched via the electronic carburetor control such that the hydraulic medium reaches via lines 41 and 31 the pressure chamber 14 of the housing 12. The other proportional solenoid valve 34 remains switched such that the pressure chamber 15 has a connection to the reservoir 39. Due to the pressurized hydraulic medium the piston 10 is displaced to the right counter to the force of the compression spring 17 in FIG. 3*b*. Accordingly, the piston rod 9 is also displaced to the right and the angular lever 5 is pivoted counterclockwise. Thus, the throttle valve 2 is pivoted in direction toward its closing position. Thus it is also possible for a full load position of the accelerator pedal 1 to ensure an optimal gear switching operation. The housing 12 is not displaced relative to the bearing housing 22 during this gear shifting operation. Accordingly, the intermediate member 13 remains in its respective position so that the accelerator pedal 1 remains in its full load position. In this case the change of the return force of the return spring 7 can be noticed at the accelerator pedal 1 so that the driver immediately knows that the position of the throttle valve 2 has been changed.

As soon as the gear switching operation is terminated, the two valves 33, 34 are again switched to be without pressure so that the piston 10 is only subjected to the force of the compression springs 16, 17. The piston 10 is thus returned into its defined middle position within the housing 12.

For the return of the piston 10 into a defined middle position a travel control is not required. Thus, the inventive actuating device provides a constructively simple design whereby it is ensured that the piston 10 is reliably returned into its middle position.

The respective position of the throttle valve 2 is conventionally determined by a potentiometer 43 (FIG. 1).

In each of the intermediate positions between the idle position and the full load position of the accelerator pedal 1 the control device 11 operates in the same manner. The housing 12 is displaceably guided within the bearing housing 22 in a sealed manner whereby the piston rod 9 extends from the housing 12 and the bearing housing 22 in a sealed manner. Due to the aforedescribed design the accelerator linkage is comprised of two parts 9 and 13 that are displacable relative to one another, but operate as a rigid component as long as no gear shifting operation takes place. Only when a gear shifting operation is initiated, the piston rod 9 is displaced relative to the intermediate member 13 in the aforedescribed manner in order to adjust the throttle valve 2 into a position required for the gear shifting operation. This has the advantage that the displacement of the throttle valve 2 is not noticeable by a position change of the accelerator pedal 1. However, the driver at any given time is aware that a gear shifting operation with the corresponding position adjustment of the throttle valve 2 has taken place due to the corresponding change of the force exerted by the return spring 7 which is noticeable at the accelerator pedal.

Depending on whether a gear shifting operation to a higher or lower gear takes place, one of the pressure chambers 14 or 15 is loaded with the hydraulic medium.

In a further non-represented embodiment only the housing 12 is provided. In this case no annular grooves 25, 26 are required. Instead the bores 27, 28 are connected to a flexible line which connects the corresponding pressure chambers 14, 15 of the housing 12 to the solenoid valves 33 and 34. The housing 12 in this case is guided in at least one guide which is for example in the form of a ring. The function of such an adjusting device is identical to the embodiment described in connection with FIGS. 1 to 3.

Figure 4:
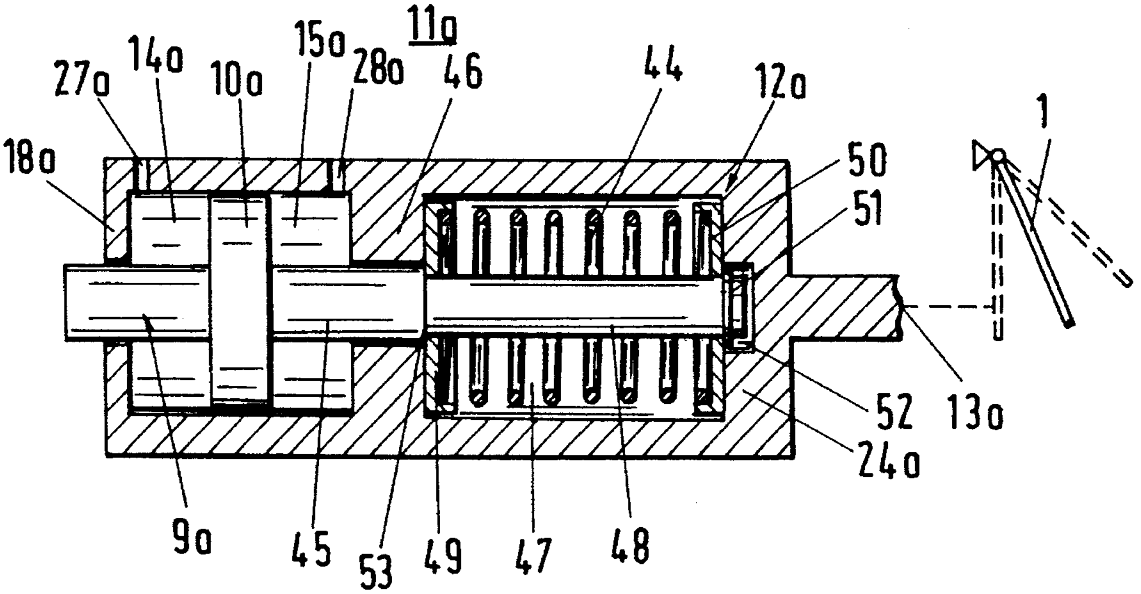
FIG. 4 shows a second embodiment of a control device of the inventive actuating device.

FIG. 4 shows a control device 11*a* in which only one compression spring 44 is used. The piston rod 9*a* has an enlarged piston rod section 45 on which the piston 10*a* is positioned and which is guided within the end wall 18*a* of the housing 12*a* as well as within a radially inwardly oriented annular shoulder 46 of the housing 12*a*. The piston rod section 45 penetrates in a sealing manner the end wall 18*a* and the annular shoulder 46. The piston 10*a* is sealingly guided within the inner walls of the housing 12*a* and separates the two pressure chambers 14*a*, 15*a* from one another. The pressure chamber 15*a* is delimited on one side by the annular shoulder 46. Into the two pressure chambers 14*a*, 15*a* bores 27*a*, 28*a* open via which the hydraulic medium under pressure can be introduced into the pressure chambers. The annular shoulder 46 in the axial direction of the housing 12*a* is of such a diameter that the piston rod section 45 is still guided within the annular shoulder even when the piston 10*a* is displaced to its maximum extent.

The ring shoulder 46 separates the pressure chamber 15*a* from a spring chamber 47 in which a compression spring 44 is accommodated. The compression spring 44 surrounds a piston rod section 48 of a reduced diameter which advantageously is a unitary part with the piston rod section 45.

In the spring chamber 47 two spring plates 49 and 50 are provided which are seated on the piston rod section 48 and at which the compression spring 44 with its ends is supported. When the piston 10*a* is in the middle position represented in FIG. 4, the spring plate 49 rests at an annular shoulder 53 at the transition between the two piston rod sections 45 and 48. The spring plate 50 rests at a securing ring 51 which is supported close to the free end of the piston rod section 48. In the middle position of the piston 10*a* the free end of the piston rod section 48 extends into a depression 52 within the end wall 24*a* of the housing 12*a*. The distance between the securing ring 51 and the annular shoulder 53 corresponds to the distance between the shoulder surface 46 and the end wall 24*a* of the housing 12*a*. Accordingly, the piston 10*a* is fixed in its middle position as represented in FIG. 4. As long as no automatic gear shifting operation takes place the entire control unit 11*a* is moved as a unit when the accelerator pedal 1 is actuated. The intermediate member 13*a* is again fixedly connected, preferably as a unitary part, to the housing 12*a*. The piston rod 9*a*, as described in connection with FIGS. 1 to 3*a*, 3*b*, is pivotably connected to the angular lever 5 with which the throttle shaft 4 is rotated for the adjustment of the throttle valve 2. The solenoid valves 33 and 34 are connected in the aforedescribed manner to the bores 27*a*, 28*a* of the housing 12*a*. As long as no gear shifting operation takes place, the solenoid valves 33, 34 are without pressure as described above. The piston 10*a* is fixed in its middle position by the compression spring 44.

When a gear shifting operation takes place, one of the two solenoid valves 33, 34 (FIG. 1) is switched such that the pump 38 conveys the hydraulic medium into the corresponding pressure chamber 14*a*, 15*a* depending on whether shifting into a higher or lower gear is to be performed. Thus, the piston 10*a* is displaced counter to the force of the compression spring 44 into the desired direction so that via the piston rod 9*a* and the angular lever 5 the throttle shaft 4 is rotated in the required direction. When the piston 10*a* is shifted to the left of FIG. 4, the spring plate 49 rests at the annular shoulder 46 while via the securing ring 51 the spring plate 50 is displaced in the direction toward the spring plate 49 within the spring chamber 47 of the housing 12*a* so that the compression spring 44 is correspondingly tensioned. In this case, the pressure chamber 15 is supplied with pressurized hydraulic medium.

When the piston 10*a* is moved to the right in FIG. 4, the spring plate 50 rests at the end wall 24*a* of the housing 12*a* while the spring plate 49 is displaced by the annular shoulder 53 between the two sections 45 and 48 in the direction toward the spring plate 50. The depression 52 within the end wall 24*a* is of such a depth that the piston 10*a* can be displaced to the required extent. In this case, the pressure chamber 14*a* is supplied with pressurized hydraulic medium of such a magnitude that the force of the compression spring 44 is overcome.

As soon as the gear shifting operation is terminated, the two solenoid valves 33, 34 are switched such that the respective pressure chamber 14*a*, 15*a* is connected to the reservoir 39. The compression spring 44 displaces the piston 10*a* into the defined middle position represented in FIG. 4.

In this embodiment a travel control is also not required in order to return the piston rod 9*a* into the initial position. The compression spring 44 ensures in a very simple manner that the piston 10*a* is returned into the middle position. The embodiment according to FIG. 4 has the advantage that the piston 10*a* can be dimensioned independent of the size of the compression spring 44. The piston 10*a* therefore can be of very small dimensions independent of the required force of the compression spring 44 and thus of its required diameter. Accordingly, the hydraulic portion of the control device 11*a* can be of a very compact design. Furthermore, with this embodiment the corresponding position of the accelerator pedal 1 during a gear shifting operation initiated by the automatic transmission is not changed because during the gear shifting operation only the piston rod 9*a* together with the piston 10*a* is displaced relative to the housing 12*a*. However, the driver realizes by the changed return force of the return spring 7 that the throttle valve 2 has been moved to a new position required for the newly shifted gear.

The present invention is, of course, in no way restricted to the specific disclosure of the specification and drawings, but also encompasses any modifications within the scope of the appended claims.

What I claim is:

1. An actuating device for a throttle valve of a carburetor used in connection with an automatic transmission, wherein the throttle valve is connected to a throttle shaft and a position of the throttle shaft is adjustable by an accelerator pedal of a vehicle; said actuating device comprising:

a linkage comprising a first part and a second part;

said first part connected to the throttle shaft and said second part connected to the accelerator pedal;

said first part being displaced relative to said second part with a pressure medium for performing an automatic gear shifting operation;

said first part being a piston with a piston rod, said piston being loaded by said pressure medium;

said second part comprising a housing in which housing said piston is displaceably positioned, said housing having two pressure chambers separated from one another by said piston;

a single compression spring with free ends for biasing said piston into a middle position within said housing, wherein said piston remains in said middle position as long as an automatic gear shifting operation does not take place;

two spring plates, wherein each one of said free ends abuts one of said spring plates.

2. An actuating device according to claim 1, wherein said second part comprises an intermediate member connected to said housing and pivotably connected to the accelerator pedal.

3. An actuating device according to claim 1, further comprising a pressure medium source with valves, wherein each said pressure chamber is connected with one said valve to said pressure medium source.

4. An actuating device according to claim 1, wherein said valves are proportional solenoid valves.

5. An actuating device according to claim 1, wherein said housing comprises a spring chamber for receiving said compression spring.

6. An actuating device according to claim 5, wherein said housing has a partition for separating said spring chamber from an adjacent one of said pressure chambers.

7. An actuating device according to claim 1, wherein said spring plates are positioned on said piston rod.

8. An actuating device according to claim 7, wherein said piston rod has a tapered section on which said spring plates are supported.

9. An actuating device according to claim 8, wherein said tapered section has a free end and a securing element connected to said free end and wherein one said spring plate is supported in said middle position of said piston at said securing element.

10. An actuating according to claim 9, wherein said securing element is a securing ring.

11. An actuating device according to claim 9, wherein:

said piston rod further has an enlarged section adjacent to said tapered section such that said enlarged section forms an annular shoulder adjacent to said tapered section; and the other one of said spring plates in said middle position of said piston is supported at said annular shoulder.

12. An actuating device according to claim 10, wherein:

said housing has two abutment surfaces for supporting a respective one of said spring plates during an automatic gear shifting operation; and a distance between said securing element and said annular shoulder is equal to a distance between said two abutment surfaces of said housing.

* * * * *